O. L. BERGER & H. GUETTLER.
APPARATUS FOR REMOVING AND RECOVERING BARK.
APPLICATION FILED APR. 21, 1915.
1,253,340. Patented Jan. 15, 1918.
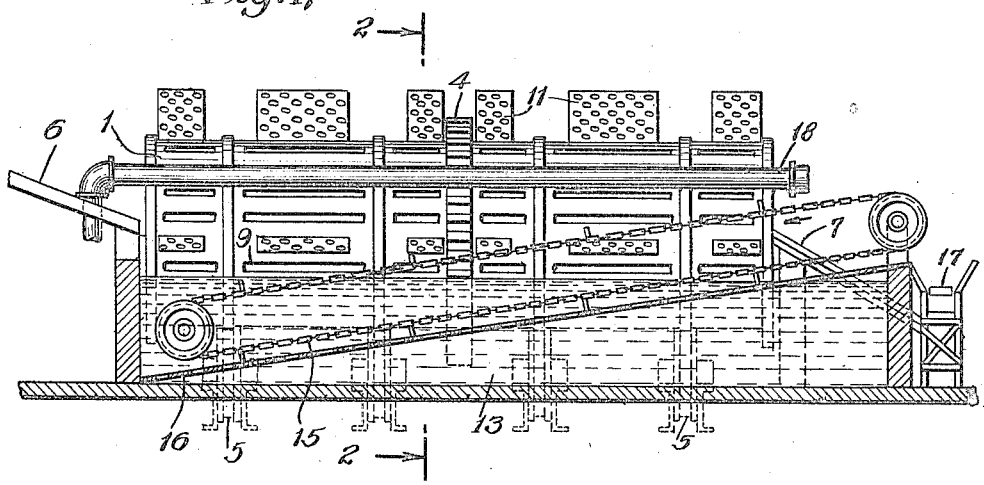
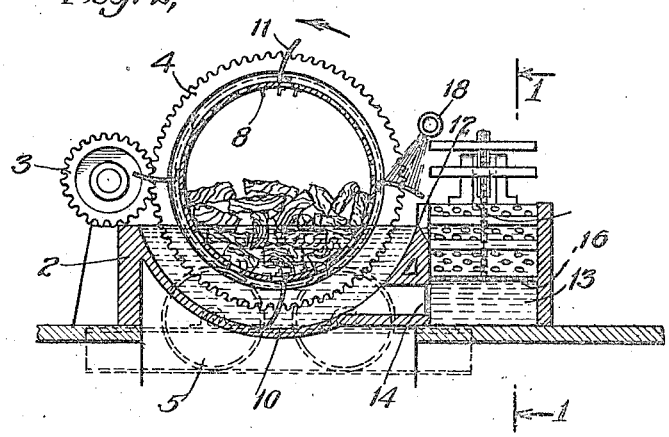
INVENTOR
O. L. Berger
H. Guettler
BY
Pennie Davis & Marvin
ATTORNEYS

UNITED STATES PATENT OFFICE.

OLE L. BERGER, OF PORT EDWARDS, WISCONSIN, AND HERBERT GUETTLER, OF ESCANABA, MICHIGAN, ASSIGNORS TO AMERICAN BARKING DRUM COMPANY, OF CHICAGO, ILLINOIS, A CORPORATION OF ILLINOIS.

APPARATUS FOR REMOVING AND RECOVERING BARK.

1,253,340.  Specification of Letters Patent.  Patented Jan. 15, 1918.

Application filed April 21, 1915. Serial No. 22,764.

*To all whom it may concern:*

Be it known that we, OLE L. BERGER, a citizen of the United States, residing in Port Edwards, Wood county, Wisconsin, and HERBERT GUETTLER, a subject of Hakon VII, King of Norway, residing in Escanaba, Delta county, Michigan, have invented certain new and useful Improvements in Apparatus for Removing and Recovering Bark; and we do hereby declare the following to be a full, clear, and exact description of the invention, such as will enable others skilled in the art to which it appertains to make and use the same.

The present invention relates to bark removing machines of the type in which blocks of wood from which the bark is to be removed are tumbled in a rotating drum in the presence of water, the tumbling action serving to detach the bark from the wood. In machines of this type it has been customary to allow the detached pieces of bark to be carried away with the water, and the consumption of water for transporting the bark and getting rid of it has been relatively large.

It is the object of the present invention to provide a machine by which the bark is removed, and the detached pieces of bark are reclaimed from the water so that after drying they may be used for fuel, or other useful purposes. In accordance with our invention, the water necessary for the bark removal may be used repeatedly.

Other objects and advantages will be made clear by the following description, which is to be taken in conjunction with the accompanying drawings, wherein—

Figure 1 is a sectional elevation on the line 1—1 of Fig. 2; and

Fig. 2 is a transverse section on the line 2—2 of Fig. 1.

In the drawings, the embodiment of the invention here disclosed comprises a drum 1, preferably of cylindrical shape, and open at both ends and adapted for rotation in a tank 2 adapted to contain water.

The drum may be rotated by means of a pinion 3 meshing with a rack 4 encircling the drum, and the drum is mounted in usual manner on suitable rollers or wheels 5 on which it may roll when the blocks of wood are to be tumbled in the drum. The blocks of wood may be introduced into the drum over a chute 6 and will be delivered from the other end of the drum over a chute 7, and the tumbling action within the drum may be facilitated by means of longitudinal baffles or angle plates 8 on the inside of the drum to insure positive movement and agitation of the wood. In the side of the rotating drum are a plurality of openings 9 of such size as to permit the ready delivery therethrough of bark detached from the blocks of wood without, however, permitting the escape of any of the blocks.

The tank 2, wherein the lower part of the rotating drum is immersed in water, is of relatively shallow form and has a concave bottom 10, preferably concentric with the rotating drum, and spaced therefrom by but a relatively short distance. Secured to the face of the drum are a plurality of paddles or flights 11, adapted to sweep through the water in tank 2 and remove therefrom the pieces of bark discharged through the openings in the rotating drum. Preferably these paddles 11 are perforated and are not continuous from end to end of the drum, and are crowned or curved backward, as shown in Fig. 2, to facilitate the delivery of bark therefrom over the edge 12 of the tank. By making the paddles long enough to almost touch the bottom of tank 2, there is no chance for bark to accumulate in any considerable quantity in the tank, or become packed together in the bottom of the tank, and thereby offer great resistance to the movement of the paddles.

Adjacent to tank 2, and preferably extending along the side thereof throughout its entire length, is a compartment 13 adapted to contain water and communicating near its bottom with tank 2 as through a screened channel 14, so that there may be a free flow of water from the compartment into the tank. Within this compartment is an endless conveyer 15 having flights movable over an inclined drainage plate 16, so that the pieces of bark delivered over the edge 12 of the tank 2 may be elevated along the drainage plate and finally delivered over the end thereof to a conveyer 17 leading to press rolls or other pressing devices, not shown, whereby the water may be more completely removed from the bark so that the bark may be conveniently handled and stored and may be used for fuel or other industrial purposes.

To facilitate the delivery of bark by the paddles 11 over the edge 12 of the tank, there may be provided a spray pipe 18 extending along the side of the drum and having jet openings arranged to deliver water against the face of the paddles as they rise out of the water of the tank. The water so delivered compensates for that carried off by the blocks of wood, and by the reclaimed bark, and maintains a proper water level in the tank and renews the water therein as often as is necessary. The free passage of water through the screened opening 14 from the compartment into the tank maintains a proper water level in both and provides for continuous return to the tank of water lifted over the edge thereof by rotating paddles, though by making the paddles perforated and of proper dimensions, there need be no violent agitation of the water in tank 2 and no great loss of water therefrom through the action of the paddles.

In cases where use is made of hot water or water charged with treating chemicals, the economy in water effected by the arrangement above described, is of particular importance.

We claim:

1. In a bark removing machine, the combination of a cylindrical drum open at its ends and adapted to continuously receive through one of said ends blocks of wood from which the bark is to be detached, a tank adapted to contain water and in which said wood is immersed as said drum is rotated, flights within said drum for tumbling the wood, means for continuously rotating said drum, and backwardly curved flights secured to said drum for lifting the bark from said tank over the edge thereof when said drum is rotated.

2. In a bark removing machine, the combination of a rotatable drum open at its ends and adapted to continuously receive blocks of wood through one end and to discharge them through the other end, a tank adapted to contain water wherein said wood is immersed, said tank having a concave bottom which throughout is substantially concentric with said drum, and flights on said drum for continuously removing bark from the water in said tank and preventing substantial accumulation thereof under said drum by carrying the bark out of the tank.

3. In a bark removing machine, the combination of a rotatable drum adapted to continuously receive blocks of wood from which the bark is to be detached, a shallow tank adapted to contain water wherein said drum may rotate, said tank being throughout substantially concentric with said drum and free from bark retaining corners, a compartment adjacent to said tank, means for continuously rotating said drum and means for continuously delivering the detached bark over the edge of said tank into said compartment.

4. In a bark removing machine, the combination of a rotatable drum open at its ends and adapted to continuously receive blocks of wood from which the bark is to be detached, a tank adapted to contain water wherein said drum may rotate, said tank being throughout substantially concentric with said drum, a compartment adjacent to said tank, means for continuously rotating said drum, means for continuously delivering the detached bark from said tank to said compartment, and an endless conveyer in said compartment for carrying the bark away.

5. In a bark removing machine, the combination of a rotatable drum open at its ends and adapted to receive and to discharge therethrough blocks of wood from which the bark is to be detached, a tank adapted to contain water wherein said drum may rotate, said drum having openings in its side to permit the detached pieces of bark to pass outward into said tank, means for continuously rotating said drum, a compartment adjacent to said tank, flights on said drum for lifting the detached bark over the edge of said tank into said compartment, an inclined drain plate in said compartment and an endless conveyer traveling over said plate to elevate the bark from said compartment, and means for returning the water from said compartment to said tank.

6. In a bark removing machine, the combination of a rotatable drum open at its ends and adapted to receive blocks of wood from which the bark is to be detached, said drum having openings in its side through which the detached bark may pass, a tank adapted to contain water wherein said drum may rotate, said tank having a concave bottom which throughout is substantially concentric with said drum, means for continuously rotating said drum, a compartment adjacent to said tank, flights on said drum for continuously lifting the bark over the edge of said tank into said compartment, an inclined drain plate in said compartment, and means for elevating the bark along said drain plate and out of said compartment; substantially as described.

7. In a bark removing machine, the combination of a rotatable drum open at its ends and adapted to receive blocks of wood from which the bark is to be detached, said drum having openings in the side through which the detached bark may pass, a shallow tank adapted to contain water wherein said wood may be immersed as said drum is rotated, said tank having a curved bottom substantially concentric with said drum, a compartment at the side of said drum and adapted to contain water, perforated paddles secured to the face of said drum and adapted to lift bark over the edge of said tank into said compartment, an inclined drain plate in said compartment and an endless conveyer with flights movable over said inclined plate for elevating bark along said plate and out of said compartment; substantially as described.

8. In a bark removing machine, the combination of a rotatable drum adapted to receive blocks of wood from which the bark is to be detached, openings in the side of said drum to permit the escape therefrom of the detached bark, a tank adapted to contain water wherein said drum may be rotated, said tank having a curved bottom substantially concentric with said drum, a compartment at the side of said tank and communicating therewith through a screened opening to permit the passage of water from the compartment to the tank, perforated paddles on said drum movable through said tank to lift the bark therefrom over the edge of the tank into the adjacent compartment, means for spraying said paddles to facilitate delivery of bark therefrom, and means for recovering and drying the bark thus delivered to said compartment.

9. In an apparatus for barking wood, the combination of a tank to contain a quantity of water, a drum to receive the wood to be barked and rotatable in the tank, said drum being provided with openings through which the bark may escape into the tank, blades projecting from the exterior of the drum and adapted in the rotation thereof to sweep through the tank and remove the bark therefrom, said blades being inclined relatively to the radius of the drum backward from the direction of rotation, and a trough at the side of the drum to receive the bark delivered by the blades; whereby the blades as they pass the edge of the drum will extend downwardly at a decided inclination and thus facilitate the discharge of the bark.

In testimony whereof we affix hereto our signatures.

OLE L. BERGER.
HERBERT GUETTLER.